Sept. 4, 1956  D. W. HOPKINS  2,761,424
VARIABLE STROKE CUSHIONED VALVES
Original Filed July 28, 1948  3 Sheets-Sheet 1
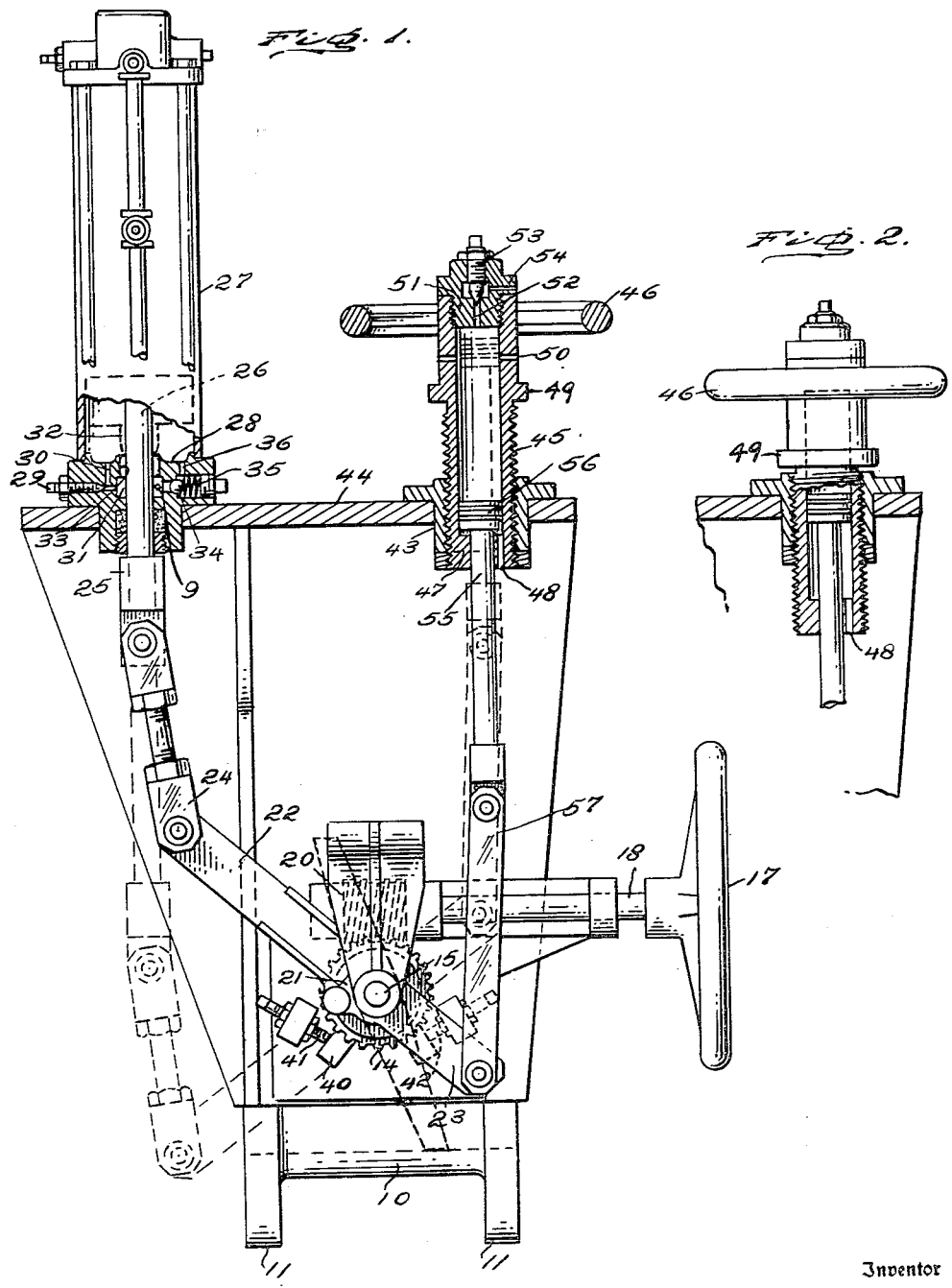
Inventor
DAVID W. HOPKINS.
By Frank H. Borden
Attorney

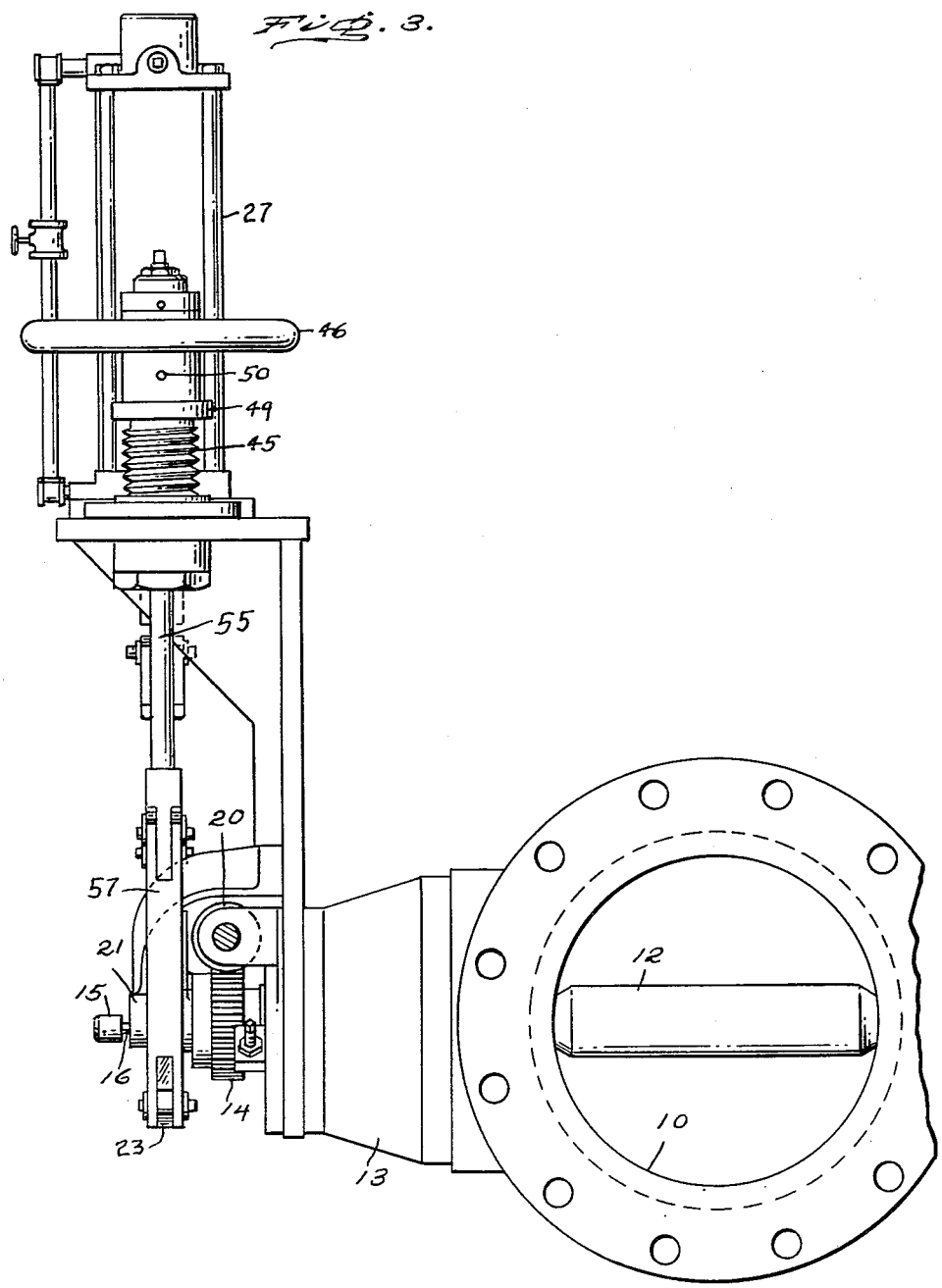

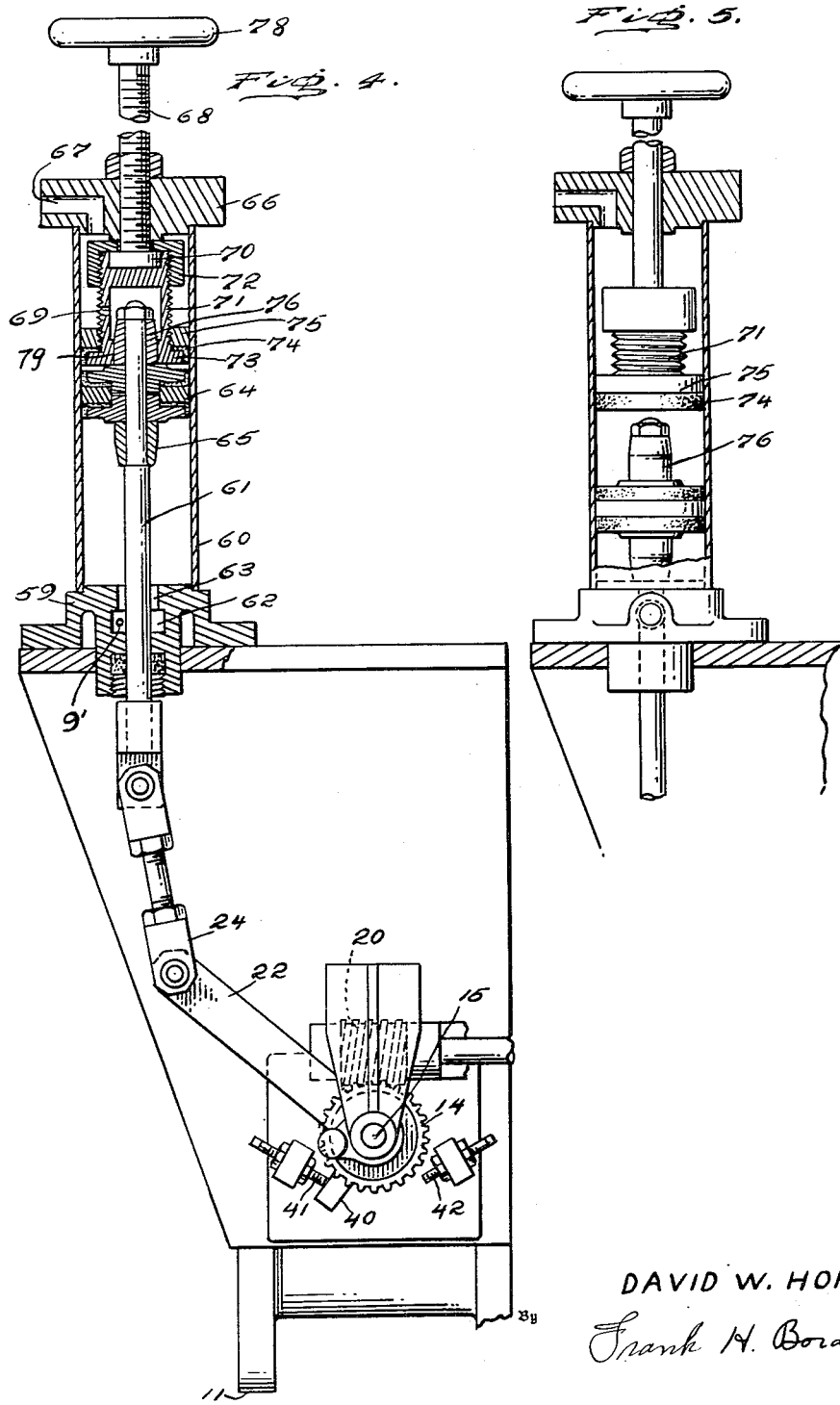

United States Patent Office 2,761,424
Patented Sept. 4, 1956

2,761,424

VARIABLE STROKE CUSHIONED VALVES

David Walter Hopkins, Philadelphia, Pa., assignor to R-S Products Corporation, Philadelphia, Pa., a corporation of Pennsylvania Original application July 28, 1948, Serial No. 41,028, now Patent No. 2,646,074, dated July 21, 1953. Divided and this application April 30, 1953, Serial No. 352,253

2 Claims. (Cl. 121—38)

This invention relates to cushioned variable stroke valves and is a division of Patent 2,646,074, eventuating from application 41,028, filed July 28, 1948.

It has been found essential for the long life of valves, in those cases where the valve actuation is as a result of the stroke of a power piston coupled to the movable portion of the valve, and particularly, although not restrictedly, to vanes of butterfly valves, that both the closing and the opening strokes must be retarded and cushioned just prior to attainment of the particular limit of the valve element motion. Many devices have been proposed for the purpose.

A cushioned stroke of the power piston and cylinder in effect provides a sort of dash pot at the ends of the stroke, by which entrapped fluid, such as air, is compressed and slowly allowed to bleed to permit the completion of the stroke. This is quite satisfactory, but it is restricted in operativeness, as far as the cushioning of the stroke in both directions is concerned at least, to the full stroke of the valve, between fully open and fully closed, or requires changes in leverage in order to modify the actual valve movement, which is a complex matter involving replacement of parts. As there are many situations in which a partial stroke only is desired, known existing equipment as it is provided is powerless to secure such cushioned partial stroke.

It is among the objects of this invention to provide a power cylinder for operating valves having a variable stroke which is cushioned at both ends thereof; to improve valve actuating devices; to provide a valve actuating device having one fixed cushioned limit to its stroke and having the other limit a variable to limit the length of the effective stroke with means for cushioning the stroke at such variable limit; to improve valve constructions; to provide a variable stroke valve operating assembly with cushioning at each end of the stroke, in which the variation is a simple, easy, and quick manual actuation; and to provide other objects and improvements as will hereinafter appear.

In the accompanying drawings forming part of this description:

Fig. 1 represents a side elevation, partially in fragmentary section, through a valve-operating mechanism provided with a stroke adjustment cushioning device, showing the adjustment of the latter to permit the full power stroke of the actuating device;

Fig. 2 represents a fragmentary side elevation, partially in fragmentary section, of the stroke adjustment cushioning device in a position of adjustment for securing a substantially half stroke only from the power unit shown in Fig. 1;

Fig. 3 represents a side elevation of the device of Fig. 1, with the parts in the position shown in Fig. 1;

Fig. 4 represents a fragmentary side elevation, partially in vertical section, through a modified form of the invention, in which the adjustment is in the power cylinder itself;

Fig. 5 represents a fragmentary side elevation, partially in vertical section of the power cylinder showing an adjustment thereof to establish substantially one-half stroke from the mechanism.

The valve body 10 is provided with attaching flanges 11 and with a movable element for closing and opening the valve. Illustratively, but preferably, the valve in question is a butterfly valve controlled by a vane 12 mounted on a suitable shaft, passing outwardly through a stuffing box or the like 13. A worm gear 14 is mounted for disconnectible engagement with the shaft of the vane 12, controlled from the outer end of the assembly by the axially movable push element 15 mounted on the push rod 16. This portion of the assembly is of no importance so far as this invention is concerned, and the worm gear is keyed to or released from the vane shaft as the element 15 is pushed in or out, in any desired manner. A hand wheel 17 is provided on a shaft 18 in driven relation to a worm pinion gear 20 in constant mesh with the worm gear 14. This is to permit hand operation of the vane when desired or necessary. A lever 21 is mounted on the shaft of the vane 12, and has a power operated arm 22 and a damping or restraining arm 23, in substantial alignment across the axis of the shaft of the vane. The usually longer arm 22, at its free end carries pivotally one end of an adjustable link 24, and the other end of the link 24 is pivoted to the end of the power shaft or piston rod 25 connected to the piston 26 of the power cylinder 27. The power cylinder 27 may be formed as desired so long as it provides cushioning at one end of the stroke at least. In the position of the parts shown in full lines in Fig. 1, the piston 26 is at the upper end of its stroke. Suitable compression space defining means are provided to insure that entrapped fluid is compressed and vented at the top in any desired manner as shown, for instance, in section at the bottom of the cylinder. The upper and lower closures of the cylinder are substantially identical (except for the passage of shaft or connecting rod 25), and the stroke is cushioned at both ends thereof, so that no additional disclosure of the upper end is deemed necessary. The cylinder end is provided with a transverse barrier-surface 28, against which the piston compresses air or other fluid. It will be understood that the cushion may be pre-set by providing a fixed rate of bleed as shown in Figs. 4 and 5, or may be made adjustable as will be described of the disclosure of Fig. 1. The compressed fluid passes through small orifice 30 into the chamber 31 restricted in its flow by the adjustable needle valve 29, and passes at a controlled rate into chamber 31, from which by a vent aperture 9 it passes out of the chamber 31. This is facilitated by the axial sealing projection 32 on the piston 26, which extends into and seals the axially extending orifice 33 forming a communication between the annular chamber 31 and the cylinder bore. At this time the ball check valve 34 is closed by its spring 35 and the cushioning is at a rate controlled by the needle valve. To apply working pressure to the piston, fluid under pressure is brought into the vent orifice at such pressure as to unseat the ball check valve, to free passage through port 36 against the end of the piston in the cylinder. If any fluid under pressure passes through the needle valve aperture, it, too, passes into the cylinder against the piston.

With the power piston so furnished, it will be seen that the stroke of the shaft 25 through a full stroke is cushioned at each end of the stroke, and that starting with the valve full open (in full lines), for instance, it will be forced to full closed (in the dotted line position indicated). In this stroke the stop element 40 carried by the shaft of the vane of the valve will move from its abutment against the adjustable stop 41 carried by the valve housing or stuffing box, from the position shown in full lines in Fig. 1, to the dotted line position, with the abutment 40 engaged against the adjustable limit stop 42, a duplicate in reverse of the stop 41. Of course, for such power actuation, the worm gear 14 will be released from its keyed connection to the shaft of the vane. The cushioning prevents the sharp impact of the mechanism at the end of the stroke and is quite desirable. As noted, if a full stroke alone is desired, nothing more need be provided than has just been described. However, in order to provide a shorter stroke for any reason, and the reasons are frequent, it will be seen that the cushioned power device illustrated is ineffective. It is, therefore, preferred to provide a variable cushion device as shown, for instance, at the right hand side of Fig. 1. In this illustrative disclosure, an internally threaded bushing 43 is provided upon a fixed portion 44 of the housing, upon which the power cylinder 27 is mounted. A cushion cylinder 45 is externally threaded and screwed into the bushing 43, and carries a hand wheel 46, by which the vertical axial position of the cylinder 45 can be varied by rotating the cylinder. The cylinder has an internal abutment 47 provided with an air inlet and exhaust opening 48, if desired, although the cylinder may just be formed with an open end. The cylinder 45 has an outer flange 49 for abutment and stop against the upper end of the bushing to mark the limit of downward adjustment of the cylinder, and is provided with the radial vent openings 50 in spaced relation to the end of the inserted plug 51. The plug has an axial bore 52, the flow through which is controlled by the needle valve 53, and the bore 52 is in communication with an exhaust passage 54. A piston rod 55 is provided with a piston 56, which latter is slidable with the shaft or rod 55 axially of the cylinder. The lower end of the shaft 55 is pivoted at one end of the link 57 and the latter pivots to the lever arm 23. It will be seen that as the power cylinder functions and the piston is forced to the bottom of its stroke in cylinder 27, the arm 22 is forced downwardly, thus rotating or moving the valve element of the valve in one direction. At the same time the lever arm 23 is elevated moving about the axis of the shaft on the vane or other moving device of the valve, forcing the piston 56 of the cushion cylinder upwardly, more or less slightly compressing the air therein as it goes. Most of the air being compressed escapes through the side vents 50 of the cylinder, but when the piston has passed by these the escape of air is precluded and it is then that actual working or cushioning compression of the air begins. The piston is sharply decelerated then in its movement as the air escapes ahead of it through port 52 controlled in bleed rate by the needle valve 53, to final escape through the exhaust port. As a general proposition, to reduce the drag on the power element, when the power cylinder with the cushioning of the stroke at each end is being used for its full stroke, the auxiliary cushioning device will have the needle valve moved to its full opening to expedite escape of the entrapped air.

When it is desired to provide a limited stroke to the valve movable element, say, for instance, in a purely illustrative form, a stroke between closed and one-half open, the valve is moved by hand or otherwise until it is in the half way position. Then the hand wheel 46 is turned and the cylinder 45 is screwed into the bushing to move the cylinder axially downwardly until the end of the piston 56 engages and abuts against the plug 51. Then the needle valve is partially closed to establish the desired slow bleed rate and the mechanism is started. The power cylinder being operated causes the piston to move partially downwardly on its stroke to move the valve movable element from its one limit toward the arbitrarily set limit, and the piston 56 moves part way on its complete stroke in the cushion cylinder 45. The substantially closed end of the cushioning cylinder has now been moved partially downwardly toward the piston 56 so that as the valve movable element moves toward the new limit, i. e. the illustrative half way position, the piston passes by the escape vents 50 and starts to slow down as the entrapped air compresses ahead of it. As the latter slowly bleeds out, the piston 56 gently abuts and is positively stopped against the plug 51 and the valve movement stops at the desired point and with a cushioning of the stop. On the return stroke the fluid pressure moves the power piston 26 upwardly toward its cushioned stop at the same time that the piston 56 is withdrawn from adjacency to the plug 51, drawing in air partially through the bleed ports and then fully through the radial openings 50, to recharge the cushion cylinder with air, without effecting any substantial drag on the power cylinder. Air entrapped between the lower side of the piston 56 and the abutment 47 passes through the vent 48.

Although the preceding is generally a preferred embodiment, an alternative form of device may be used as shown in Figs. 4 and 5. In this form of device the arm 23 of the lever on the valve movable portion is omitted, together with all parts of the auxiliary cushioning device, but the remainder is like the power end of the device shown in Fig. 1, and bears identical reference characters. In this case, however, the power cylinder 60 has a lower cushioning end through which the shaft 61 passes, and although, as shown, this is provided with a fixed rate bleed, the variable bleed of Fig. 1 may be used. The annular chamber 62 has a vent opening 9' and communicates with the interior of the cylinder through the annular passage 63. The piston 64 mounted on the shaft 61 has a lower tapered extension 65 surrounding the shaft in position to enter, seal, and then to compress fluid entrapped in the passage 63 and the annular chamber 62, as it is augmented by the compression of fluid between the lower face of the piston and the lower cylinder closure 59 containing the passages 63 and 62. At the top, the cylinder is closed by the closure element 66 and has a port 67 leading to a combined vent and power supply, just as is provided for communication with the vent from the annular chamber 62. A hand wheel controlled threaded shaft 68 passes through the closure element 66, and carries an internal swivel head 70. A movable cylinder end wall device is provided hanging upon the swivel head 70, and comprising the tubular externally threaded member 71 having the fixed bleed radial vent 69, and engaged by the threaded cap 72 to hold it to the head 70. At the lower end the member 71 has an outwardly projecting flange 73 carrying a packing element 74 held in place by the nut 75. The member 71 at the lower end is internally formed with a cylindrical axial valve seat 79 and the end of the piston shaft or rod 61 extending beyond the piston 64 carries the sealing elongated plunger 76. The member 71 is large enough to receive the upwardly advancing end of the plunger element and to compress air therein and to bleed same through opening 69 to retard the motion of the advancing piston. The power cylinder is so arranged that with the movable cylinder end at its upper position, a full power stroke predeterminedly cushioned at both ends of the stroke is provided. When it is desired to move one of the limits so as to shorten the stroke and still to provide cushioning at both ends of the stroke, the shaft 68 is rotated, as by the hand wheel 78, as shown in Fig. 5, to move the cylinder end 73 and 74 down along the inside of cylinder 60. The power stroke is then shortened with cushioning at both ends. While the cushioning has been illustrated in these figures as a pre-set bleed rate with fixed ports, it will be understood, as noted, that if desired the bleed rate can be made adjustable as disclosed in Fig. 1.

The simplicity and efficiency of the invention will be obvious.

Having thus described my invention, I claim:

1. A valve operator of variable stroke with cushioning means at each end of the variable stroke, comprising a cylinder, a fixed head at one end of said cylinder, a piston slidable in the cylinder and defining with said fixed head and said cylinder a first pressure chamber, means communicating with said first pressure chamber to energize same, a piston rod connected to the piston and slidable through said fixed head, complemental means on said piston and said fixed head for cushioning and then stopping a stroke of said piston toward said fixed head, a fixed abutment mounted on the cylinder in spaced relation to said fixed head, a movable head of such cross sectional area as to be slidable in sealing contact with the internal surface of said cylinder, said movable head defining with said cylinder and said abutment a second pressure chamber, means communicating with said second pressure chamber for conducting fluid pressure through said movable head, means operable through the abutment for varying the position of the movable head axially of the cylinder, and complemental means on the piston and said movable head for cushioning and then stopping said piston in a stroke toward said movable head.

2. A valve operator of variable stroke with cushioning means at each end of the variable stroke comprising a cylinder closed at one end by a first head and at the other end by an abutment, an axially movable head of such cross sectional area as to be slidable in sealing contact with the internal surface of said cylinder, a piston slidable in said cylinder between said first head and said axially movable head passage means for fluid pressure extending respectively through the respective first head and through said abutment and said movable head to communication with the interior of said cylinder on respectively opposite sides of said piston, a piston rod connected to said piston and slidable in the said first head, complemental dashpot means on said piston and said first head for cushioning preliminary to stopping a stroke of said piston toward said first head, complemental dashpot means on said piston and said movable head for cushioning preliminary to stopping a stroke of said piston toward said movable head, and means operating through said abutment for positioning said movable head to vary the axial length of a piston chamber defined between the respective heads and thus to vary the total complete stroke of said piston.

References Cited in the file of this patent

UNITED STATES PATENTS

| | | |
|---|---|---|
| 531,792 | Forslund | Jan. 1, 1895 |
| 1,226,673 | Kane | May 22, 1917 |
| 1,445,615 | Ferris | Feb. 13, 1923 |
| 1,558,590 | Carlson | Oct. 27, 1925 |
| 1,686,109 | Stuckey | Oct. 2, 1928 |
| 1,707,111 | Brady | Mar. 26, 1929 |
| 1,931,489 | During | Oct. 24, 1933 |
| 2,223,792 | Muir | Dec. 3, 1940 |